(12) United States Patent
Wu et al.

(10) Patent No.: US 11,732,725 B2
(45) Date of Patent: Aug. 22, 2023

(54) PROTECTION METHOD AND SYSTEM FOR USE IN FAN MALFUNCTION

(71) Applicant: Getac Technology Corporation, Hsinchu County (TW)

(72) Inventors: Chi-Jung Wu, Taipei (TW); Chun-Chi Wang, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 711 days.

(21) Appl. No.: 16/802,981

(22) Filed: Feb. 27, 2020

(65) Prior Publication Data

US 2021/0270276 A1 Sep. 2, 2021

(51) Int. Cl.
*F04D 27/00* (2006.01)
*G06F 11/30* (2006.01)
*G06F 1/20* (2006.01)

(52) U.S. Cl.
CPC ......... *F04D 27/001* (2013.01); *F04D 27/008* (2013.01); *G06F 1/206* (2013.01); *G06F 11/3058* (2013.01); *F05B 2270/1011* (2013.01); *F05B 2270/304* (2013.01); *F05B 2270/3032* (2013.01)

(58) Field of Classification Search
CPC ...... F04D 27/001; F04D 27/008; G06F 1/206; G06F 1/20; G06F 1/16; G06F 1/00; G06F 11/3058; G06F 11/30; G06F 11/00; G06F 1/3215; G06F 1/324; G06F 1/3243; G06F 1/3296; G06F 11/004; G06F 11/3024; F05B 2270/1011; F05B 2270/101; F05B 2270/10; F05B 2270/00; F05B 2270/3032; F05B 2270/304; F05B 2270/303; F05B 2270/30; Y02D 10/00
See application file for complete search history.

(56) References Cited

U.S. PATENT DOCUMENTS

| 2007/0219644 A1* | 9/2007 | Sonobe | G06F 1/3203 |
| | | | 700/12 |
| 2009/0009729 A1* | 1/2009 | Sakai | G03B 21/16 |
| | | | 353/57 |
| 2010/0030395 A1* | 2/2010 | Shimotono | G06F 1/206 |
| | | | 715/764 |

(Continued)

*Primary Examiner* — Mohamed Charioui
(74) *Attorney, Agent, or Firm* — Locke Lord LLP; Tim Tingkang Xia, Esq.

(57) ABSTRACT

Provided is a protection method for use in fan malfunctions, applicable to an electronic device, and effective in preventing the electronic device from being overheated. The electronic device includes a fan, temperature sensor, and processor. The method includes steps of: limiting the processor's performance, upon determination that not only is the fan's rotation speed greater than or equal to a predetermined upper rotation speed limit, but the electronic device's temperature sensed by the temperature sensor is also greater than or equal to a predetermined upper temperature limit; determining whether the fan's rotation speed is less than or equal to a first restored rotation speed when the fan's rotation speed is determined to be less than the predetermined upper rotation speed limit; and stopping the limiting of the processor's performance when the fan's rotation speed is determined to be less than or equal to the first restored rotation speed.

17 Claims, 7 Drawing Sheets

(56) References Cited

U.S. PATENT DOCUMENTS

2015/0118017 A1* 4/2015 Yato ............... F04D 19/002
 415/1
2015/0378403 A1* 12/2015 Chen ............... H05K 7/20209
 700/282

* cited by examiner

PROTECTION METHOD AND SYSTEM FOR USE IN FAN MALFUNCTION

BACKGROUND OF THE INVENTION

Field of the Invention

The present disclosure relates to a protection method applicable to an electronic device and, more particularly, to a protection method and system for use in fan malfunctions.

Description of the Prior Art

Conventional electronic devices have therein electronic components which generate heat. The electronic devices are each accommodated in a system which usually has therein a heat dissipation component adapted to stabilize the system. Depending on its operating principle, the system generally comes with two heat dissipation designs: fan-less design and fan-based design. The two heat dissipation designs each have their advantages and disadvantages.

Some conventional systems which have high thermal design power requirement usually adopt the fan-based design. However, it is possible that the systems are operated inappropriately and thus have their fans' draught inlets and outlets blocked. The fans can fail or can be clogged by a foreign body and thus fail to operate smoothly; as a result, these fan issues undermine the heat dissipation of the systems and thus affect the systems' performance or damage the components of the systems, or even lead to overly high surface temperature of the systems to thereby scorch the users. The aforesaid problem is a more alarming concern when it comes to handheld electronic devices, such as notebook computers and tablets.

SUMMARY OF THE INVENTION

It is an objective of the present disclosure to provide a fan protection method and system for use in fan malfunctions to protect an electronic device in the event of the fan malfunctions.

An embodiment of the present disclosure provides a protection method for use in fan malfunctions, applicable to an electronic device, the electronic device comprising a fan, a temperature sensor, and a processor, the protection method comprising the steps of: limiting the processor's performance, upon determination that not only is the fan's rotation speed greater than or equal to a predetermined upper rotation speed limit, but the electronic device's temperature sensed by the temperature sensor is also greater than or equal to a predetermined upper temperature limit; determining whether the fan's rotation speed is less than or equal to a first restored rotation speed when the fan's rotation speed is determined to be less than the predetermined upper rotation speed limit; and stopping the limiting of the processor's performance when the fan's rotation speed is determined to be less than or equal to the first restored rotation speed.

Another embodiment of the present disclosure provides a protection method for use in fan malfunctions, applicable to an electronic device, the electronic device comprising a fan, a temperature sensor, and a processor, the protection method comprising the steps of: limiting the processor's performance, upon determination that not only is the fan's rotation speed less than or equal to a predetermined lower rotation speed limit, but the electronic device's temperature sensed by the temperature sensor is also greater than or equal to a predetermined upper temperature limit; determining whether the fan's rotation speed is greater than or equal to a restored rotation speed, upon determination that the fan's rotation speed is greater than the predetermined lower rotation speed limit; and stopping the limiting of the processor's performance, upon determination that the fan's rotation speed is greater than or equal to the restored rotation speed.

An embodiment of the present disclosure provides a protection system for use in fan malfunctions, comprising a fan, a temperature sensor, and a processor. The protection system loads a computer program and executes it to carry out the protection method for use in fan malfunctions.

The protection method and system for use in fan malfunctions according to the above embodiments of the present disclosure protect an electronic device in fan malfunctions and thus effectively prevent the electronic device's temperature from continuously increasing.

The aforesaid and other objectives, features, and advantages of the present disclosure are hereunder illustrated with embodiments, depicted with drawings, and described below.

DETAILED DESCRIPTION OF THE EMBODIMENTS

Figure 1:
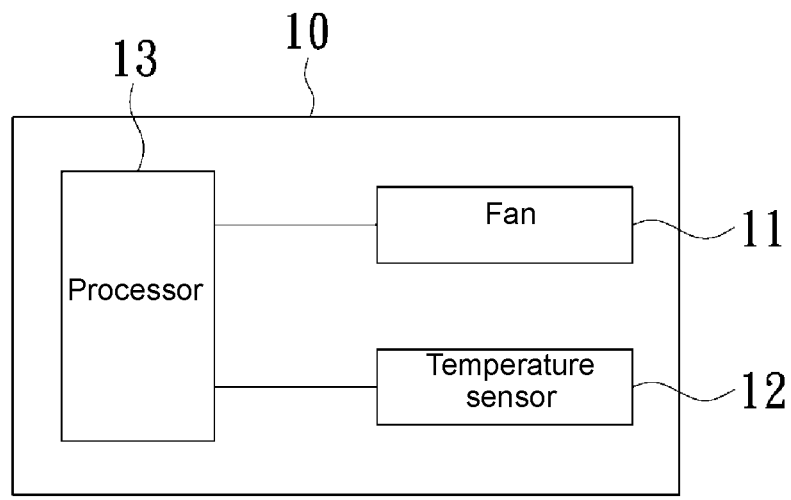
FIG. 1 is a block diagram of a protection system for use in fan malfunctions according to an embodiment of the present disclosure.

FIG. 1 is a block diagram of a protection system 10 for use in fan malfunctions according to an embodiment of the present disclosure. The protection system 10 comprises an electronic device. The electronic device comprises a fan 11, a temperature sensor 12, and a processor 13.

Referring to FIG. 1, the electronic device is, for example, a desktop computer, a notebook computer, a tablet or any appropriate electronic device. The fan 11 is provided in the number of one or more to reduce the temperature of the electronic device 10. The temperature sensor 12 is provided in the number of one or more to detect the temperature of the electronic device 10. In an embodiment, the processor 13 is electrically connected to the fan 11 and temperature sensor 12. The processor 13 loads a computer program and executes it to carry out the protection method for use in fan malfunctions.

Figure 2:
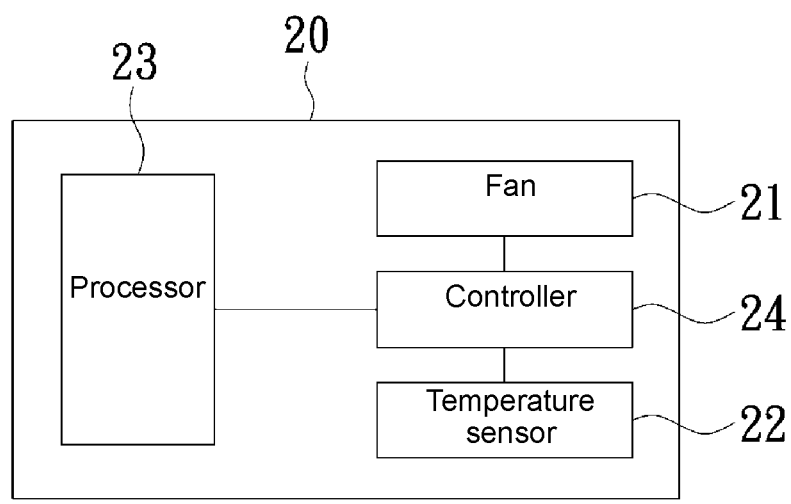
FIG. 2 is a block diagram of another protection system for use in fan malfunctions according to an embodiment of the present disclosure.

FIG. 2 is a block diagram of another protection system 20 for use in fan malfunctions according to an embodiment of the present disclosure. In an embodiment, the electronic device further comprises a controller 24, such as an embedded controller (EC) or a keyboard controller (KBC). The controller 24 is electrically connected to a fan 21, a temperature sensor 22 and a processor 23. The controller 24 loads a computer program and executes it to carry out the protection method for use in fan malfunctions. According to the present disclosure, the protection method for use in fan malfunctions is not necessarily carried out by one fan and one temperature sensor. For example, the protection method of the present disclosure may also be carried out by fans and temperature sensors. The protection method of the present disclosure is further described below.

Figure 3:
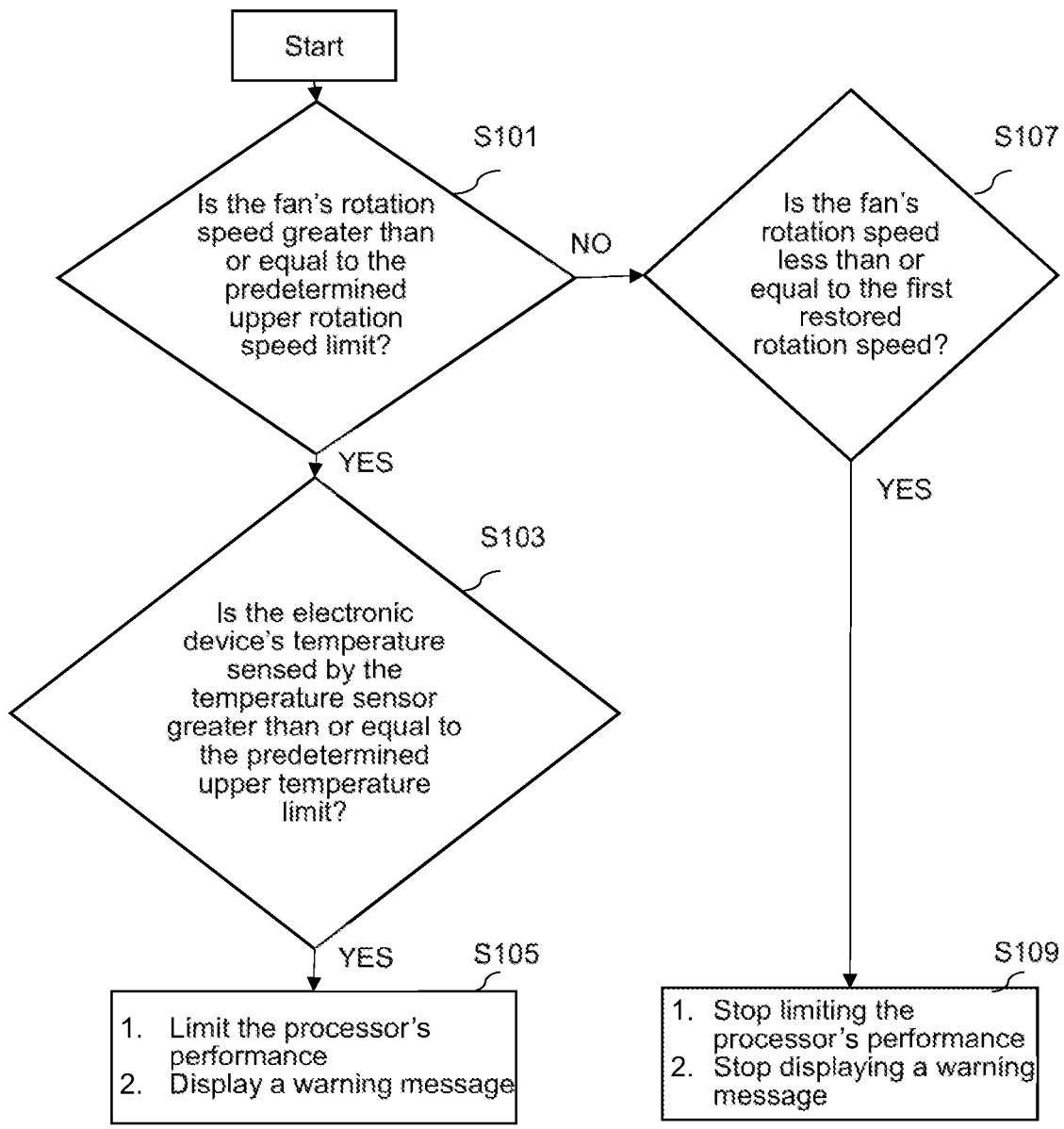
FIG. 3 is a flowchart of a protection method for use in fan malfunctions according to an embodiment of the present disclosure.

FIG. 3 is a flowchart of a protection method for use in fan malfunctions according to an embodiment of the present disclosure. The protection method comprises the steps of: determining whether the fan's rotation speed is greater than or equal to the predetermined upper rotation speed limit (step S101); determining whether the electronic device's temperature sensed by the temperature sensor is greater than or equal to the predetermined upper temperature limit, upon determination that the fan's rotation speed is greater than or equal to the predetermined upper rotation speed limit (step S103); and determining that the fan of the electronic device malfunctions and limiting the processor's performance, upon determination that the electronic device's temperature sensed by the temperature sensor is greater than or equal to the predetermined upper temperature limit (step S105).

The predetermined upper rotation speed limit is, for example, predetermined according to electronic device specifications. The predetermined upper rotation speed limit may vary from electronic device to electronic device. For example, the predetermined upper rotation speed limit is set to the upper limit of the range of normal rotation speeds of the fan of the electronic device, set to be greater than the upper limit of the range of normal rotation speeds, or set to be slightly less than or equal to the fan's revolution number limit. The predetermined upper rotation speed limit is, for example, 8200 revolutions per minute, but the present disclosure is not limited thereto. The predetermined upper temperature limit is, for example, predetermined according to the upper temperature limit of the processor operating under normal condition; hence, for example, the predetermined upper temperature limit is set to be higher than the upper temperature limit which causes damage to the electronic device or set to a user-defined temperature. The predetermined upper temperature limit is, for example, 66° C., but the present disclosure is not limited thereto.

In step S105, limiting the processor's performance is, for example, achieved by setting the processor's long-term power limit (PL1) to be less than the long-term power limit (PL1) under normal operating condition, for example, 5 W, but the present disclosure is not limited thereto. In step S105, limiting the processor's performance can also be achieved by the electronic device's entering a sleep mode or a hibernate mode. The sleep mode is, for example, achieved by suspending the processing capability of the electronic device and retaining data stored in the electronic device by low-level electric power. The hibernate mode is, for example, achieved by transferring data stored in built-in memory of the electronic device to a hard disk drive or nonvolatile memory of the electronic device and transferring, as soon as the electronic device boots again, the data from the hard disk drive or nonvolatile memory to the built-in memory so as to restore the initial operating state of the electronic device. In step S105, limiting the processor's performance can also be achieved by a combinational approach, for example, setting the long-term power limit (PL1) to a low value first, and then, after a while, allowing the electronic device to enter the sleep mode or hibernate mode or shut down if the fan is still malfunctioning.

Step S105 further comprises displaying a warning message on a display unit of the electronic device. In the embodiment illustrated by FIG. 2, after determining that the fan is malfunctioning, the controller 24 sends an event to the on-screen display (OSD) or basic input/output system (BIOS) of the electronic device and thereby displays a warning message on the display unit of the electronic device to warn the user. The warning message is, for example, an icon or text in a window, a warning sound or an optical signal. The text is, for example, descriptive of a fan malfunction or limiting the processor's performance.

The embodiment illustrated by FIG. 3 further comprises: determining whether the fan's rotation speed is less than or equal to the first restored rotation speed, upon determination that the fan's rotation speed is less than the predetermined upper rotation speed limit (i.e., when step S101 yields a negative determination) (step S107); and stopping the limiting of the processor's performance, upon determination that the fan's rotation speed is less than or equal to the first restored rotation speed (step S109). The way of stopping the limiting of the processor's performance is, for example, achieved by restoring the long-term power limit (PL1) to an initial value. Step S109 further comprises stopping the displaying of a warning message by, for example, closing a window which contains a warning message. The first restored rotation speed is, for example, less than or equal to the predetermined upper rotation speed limit. The first restored rotation speed is set according to the fan's normal rotation speed range or predetermined upper rotation speed limit. The first restored rotation speed is, for example, 6000 revolutions per minute, but the present disclosure is not limited thereto.

A protection method is provided in another embodiment by swapping step S101 and step S103 in the embodiment illustrated by FIG. 3. The protection method for use in fan malfunctions comprises the steps of: determining whether the electronic device's temperature sensed by the temperature sensor is greater than or equal to the predetermined upper temperature limit (step S103); and determining whether the fan's rotation speed is greater than or equal to the predetermined upper rotation speed limit, upon determination that the electronic device's temperature sensed by the temperature sensor is greater than or equal to the predetermined upper temperature limit (step S101).

For instance, even if the fan's rotation speed is increased to the predetermined upper rotation speed limit, the electronic device's temperature will still exceed an allowable temperature when the fan's draught outlet is blocked by a foreign body or in the event of insufficiently-ventilated surroundings. The two-step determinations of step S101 and step S103 are effective in protecting the electronic device whose temperature exceeds an allowable temperature even though the fan's rotation speed has been increased to the predetermined upper rotation speed limit. Furthermore, owing to the limited range of the temperature sensor, the temperature sensed by the temperature sensor might not be equal to the actual temperature of every point on the electronic device; as a result, in the situation where the fan's rotation speed decreases with the temperature sensed by the temperature sensor, a buffer space is attained by setting the first restored rotation speed to be less than the predetermined upper rotation speed limit, thereby allowing the electronic device's overall temperature to decrease sufficiently in order to protect the electronic device and user.

Figure 4:
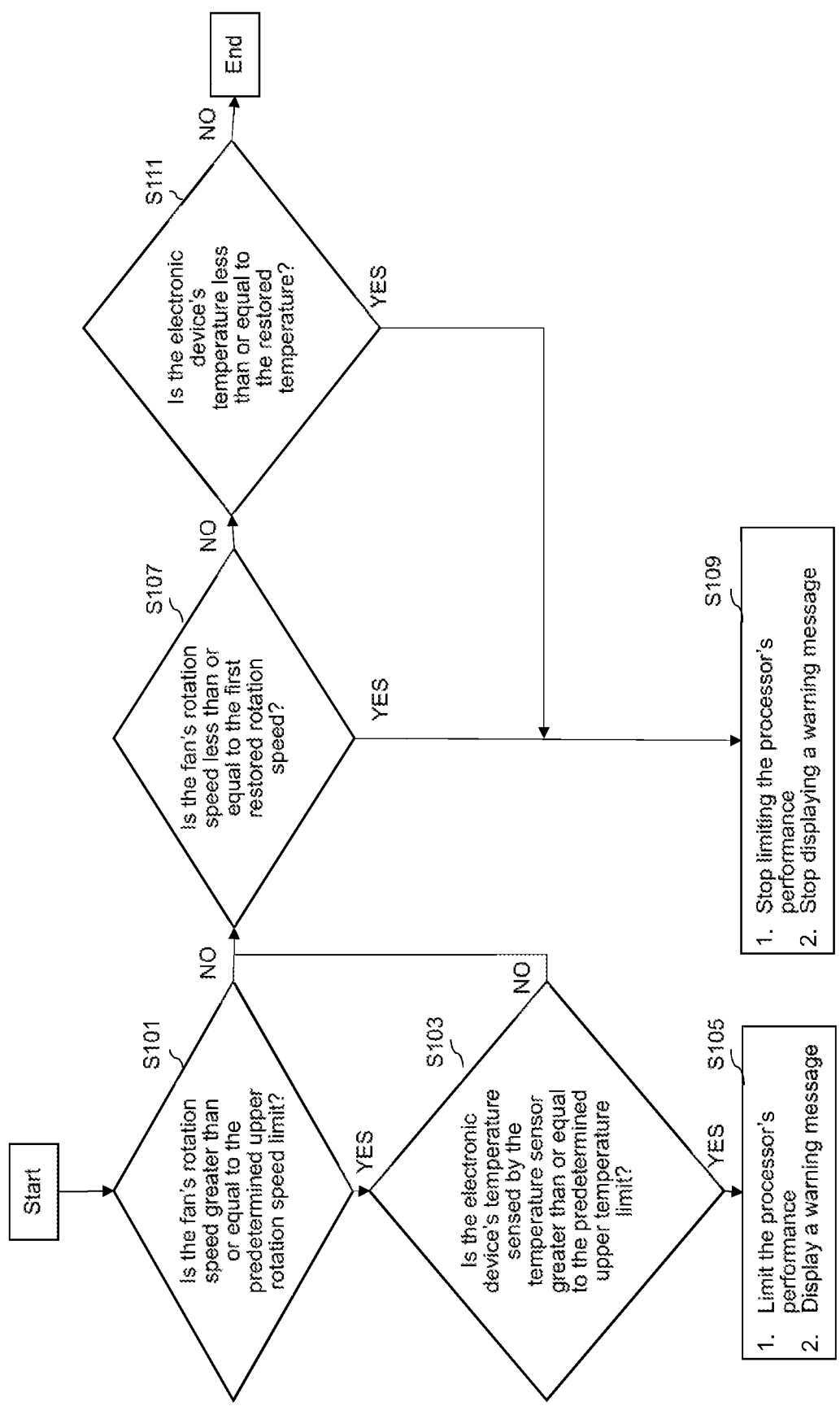
FIG. 4 is a flowchart of the protection method for use in fan malfunctions according to an embodiment of the present disclosure.

FIG. 4 is a flowchart of the protection method for use in fan malfunctions according to an embodiment of the present disclosure. Unlike the protection method in the embodiment illustrated by FIG. 3, the protection method in the embodiment illustrated by FIG. 4 comprises the steps of: performing step S107 when step S103 yields a negative determination, that is, determining whether the fan's rotation speed is less than or equal to the first restored rotation speed, upon determination that not only is the fan's rotation speed greater than or equal to the predetermined upper rotation speed limit, but the electronic device's temperature is also less than the predetermined upper temperature limit; determining whether the electronic device's temperature is less than or equal to the restored temperature when step S107 yields a negative determination (step S111); and performing step S109, upon determination that the electronic device's temperature is less than or equal to the restored temperature. The restored temperature is set to be less than or equal to the predetermined upper temperature limit, for example, 58° C., but the present disclosure is not limited thereto.

In the embodiment illustrated by FIG. 4, by performing step S107 when step S103 yields a negative determination, it is feasible to stop limiting the processor's performance as soon as the electronic device's temperature decreases sufficiently and the fan's revolution number is greater than or equal to the predetermined upper rotation speed limit. In addition, a buffer space is attained by setting the restored temperature to be less than the predetermined upper temperature limit, thereby allowing the electronic device's overall temperature to decrease sufficiently in order to protect the electronic device and user.

Figure 5:
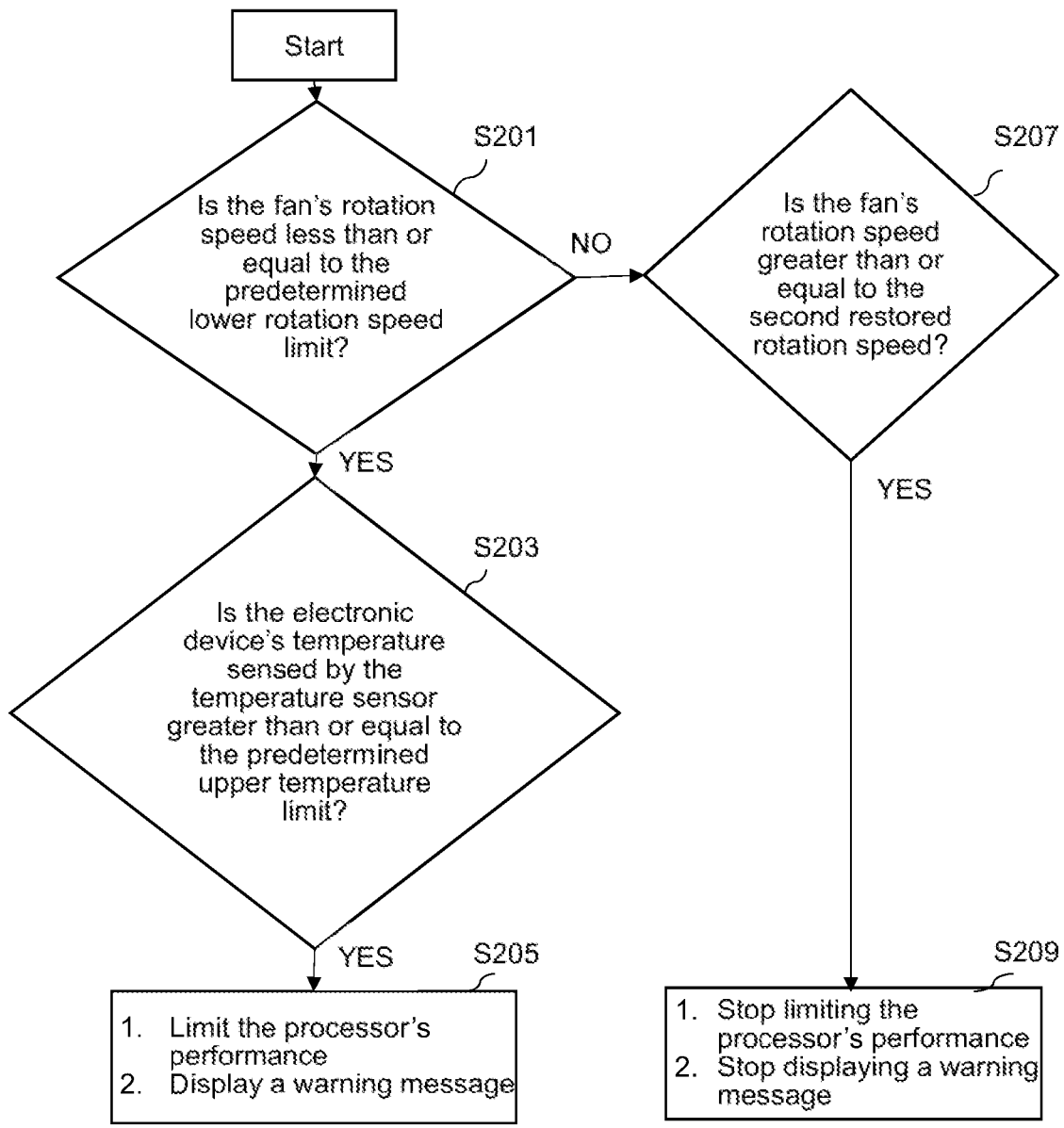
FIG. 5 is a flowchart of the protection method for use in fan malfunctions according to an embodiment of the present disclosure.

FIG. 5 is a flowchart of the protection method for use in fan malfunctions according to an embodiment of the present disclosure. The protection method comprises the steps of: determining whether the fan's rotation speed is less than or equal to the predetermined lower rotation speed limit (step S201); determining whether the electronic device's temperature sensed by the temperature sensor is greater than or equal to the predetermined upper temperature limit, upon determination that the fan's rotation speed is less than or equal to the predetermined lower rotation speed limit (step S203); confirming that the fan of the electronic device is malfunctioning and limiting the processor's performance, upon determination that the electronic device's temperature sensed by the temperature sensor is greater than or equal to the predetermined upper temperature limit (step S205); determining whether the fan's rotation speed is greater than or equal to the second restored rotation speed when step S201 yields a negative determination, i.e., when the fan's rotation speed is determined to be greater than the predetermined lower rotation speed limit (step S207); and stopping the limiting of the processor's performance, upon determination that the fan's rotation speed is greater than or equal to the second restored rotation speed (step S209).

Like the predetermined upper rotation speed limit, the predetermined lower rotation speed limit is, for example, predetermined according to electronic device specifications. The predetermined lower rotation speed limit may vary from electronic device to electronic device. For example, the predetermined lower rotation speed limit is set to the lower limit of the range of normal rotation speeds of the fan of the electronic device, set to be less than the lower limit of the range of normal rotation speeds, or set to be a revolution number required to attain specific heat dissipation efficiency. The predetermined lower rotation speed limit is, for example, 3000 revolutions per minute, but the present disclosure is not limited thereto. The second restored rotation speed is, for example, greater than or equal to the predetermined lower rotation speed limit. The second restored rotation speed is set according to the fan's normal rotation speed range or predetermined lower rotation speed limit. The second restored rotation speed is, for example, 3000 revolutions per minute, but the present disclosure is not limited thereto. Step S203 is, for example, similar to step S103. Step S205 is, for example, similar to step S105. Step S209 is, for example, similar to step S109. For the sake of brevity, steps S203, S205, S209 are not described herein.

A protection method is provided in another embodiment by swapping step S201 and step S203 in the embodiment illustrated by FIG. 5. The protection method for use in fan malfunctions comprises the steps of: determining whether the electronic device's temperature sensed by the temperature sensor is less than or equal to the predetermined lower rotation speed limit (step S203); and determining whether the fan's rotation speed is less than or equal to the predetermined lower rotation speed limit, upon determination that the electronic device's temperature sensed by the temperature sensor is less than or equal to the predetermined lower rotation speed limit (step S201).

For instance, in the event of a fan malfunction, a deteriorated component, a clogging foreign body or a power outage, the fan will fail to attain the predetermined lower rotation speed limit, thereby not allowing the electronic device's temperature to decrease effectively. The two-step determinations of step S201 and step S203 are effective in protecting the electronic device whose temperature exceeds an allowable temperature and the fan fails to reach the predetermined lower rotation speed limit. By setting the second restored rotation speed to be greater than the predetermined lower rotation speed limit, it is feasible to ensure that the fan can attain a sufficiently large revolution number and thereby satisfactory heat dissipation efficiency.

Figure 6:
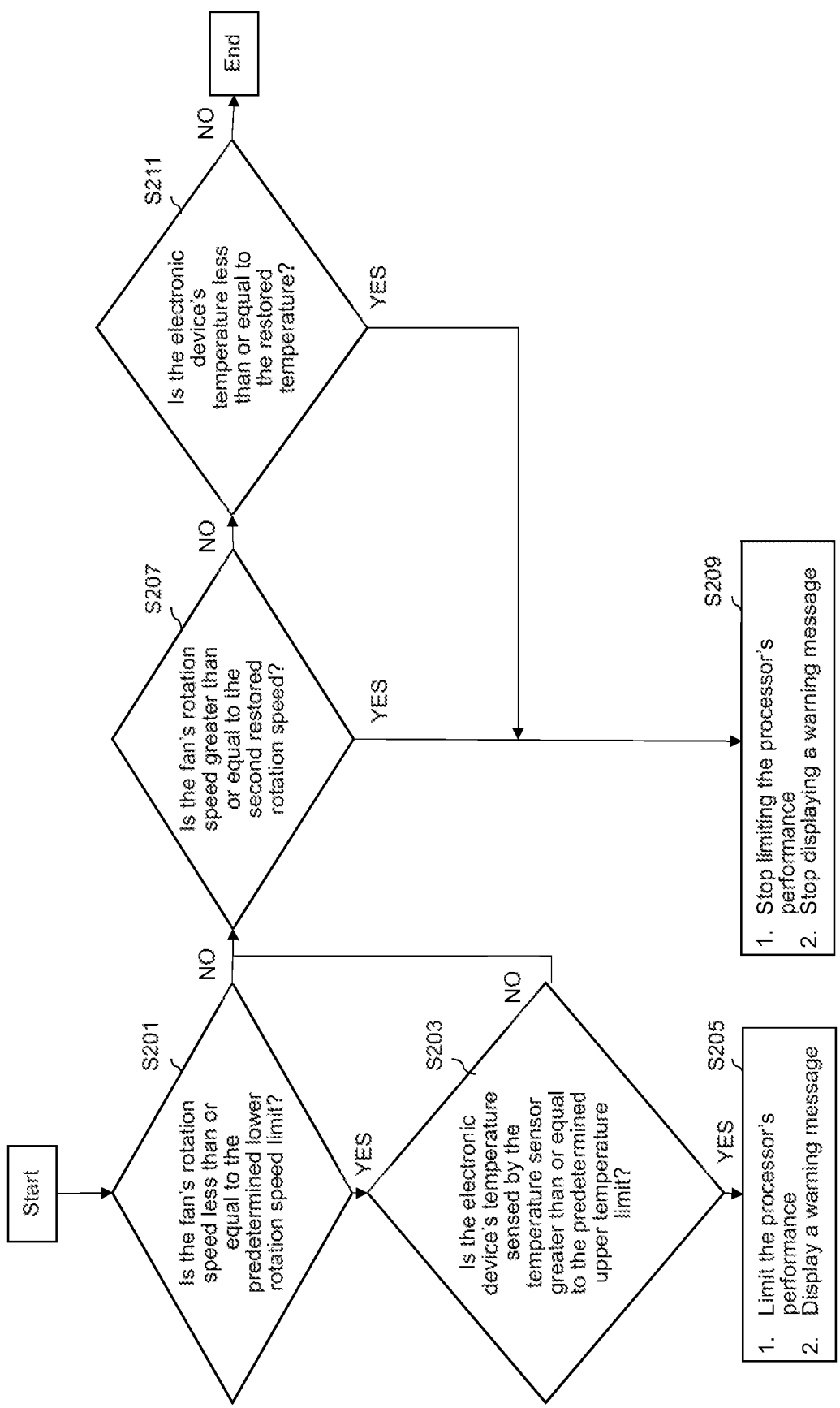
FIG. 6 is a flowchart of the protection method for use in fan malfunctions according to an embodiment of the present disclosure.

FIG. 6 is a flowchart of the protection method for use in fan malfunctions according to an embodiment of the present disclosure. Unlike the protection method in the embodiment illustrated by FIG. 5, the protection method in the embodiment illustrated by FIG. 6 comprises the steps of: performing step S207 when step S203 yields a negative determination, that is, determining whether the fan's rotation speed is greater than or equal to the second restored rotation speed, upon determination that not only is the fan's rotation speed less than or equal to the predetermined lower rotation speed limit, but the electronic device's temperature is also less than the predetermined upper temperature limit; determining whether the electronic device's temperature is less than or equal to the restored temperature when step S207 yields a negative determination (step S211); and performing step S209 upon determination that the electronic device's temperature is less than or equal to the restored temperature. The restored temperature is less than or equal to the predetermined upper temperature limit, for example, 58° C., but the present disclosure is not limited thereto.

In the embodiment illustrated by FIG. 6, by performing step S207 when step S203 yields a negative determination, it is feasible to stop limiting the processor's performance as soon as the electronic device's temperature decreases sufficiently and the fan's revolution number is less than or equal to the predetermined lower rotation speed limit. In addition, a buffer space is attained by setting the restored temperature to be less than the predetermined upper temperature limit, thereby allowing the electronic device's overall temperature to decrease sufficiently in order to protect the electronic device and user.

In an embodiment, the protection method for use in fan malfunctions is simultaneously implemented by the embodiments illustrated by FIG. 3 and FIG. 5, for example, in parallel. In another embodiment, the protection method for use in fan malfunctions is implemented by the embodiment illustrated by FIG. 3 or FIG. 4 upon determination that the fan's rotation speed is greater than the fan's rotation speed range in normal operation and implemented by the embodiment illustrated by FIG. 5 or FIG. 6 upon determination that the fan's rotation speed is less than the fan's rotation speed range in normal operation. The fan's rotation speed range in normal operation lies between the first restored rotation speed and the second restored rotation speed, for example, but the present disclosure is not limited thereto.

Figure 7:
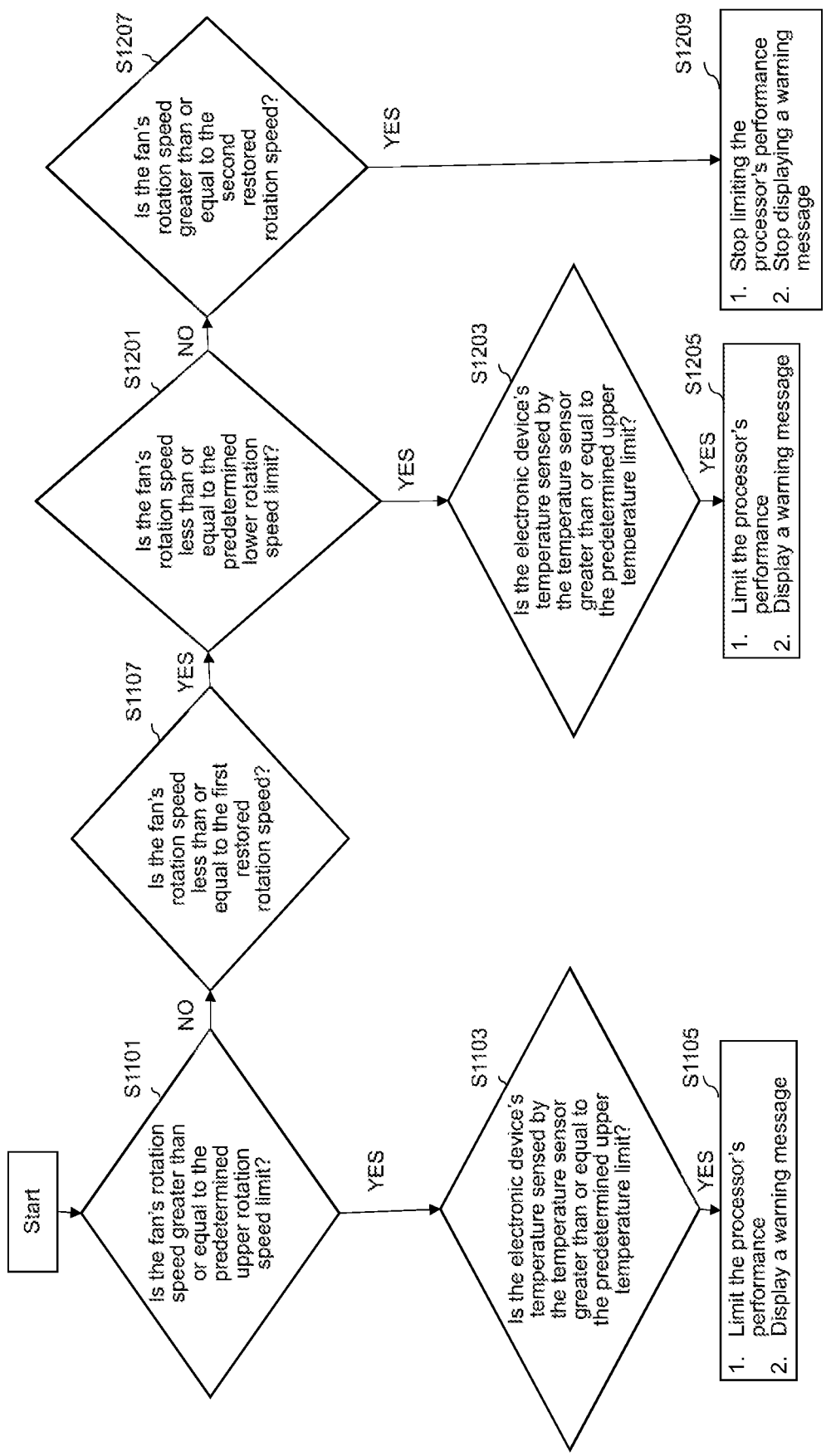
FIG. 7 is a flowchart of the protection method for use in fan malfunctions according to an embodiment of the present disclosure.

FIG. 7 is a flowchart of the protection method for use in fan malfunctions according to an embodiment of the present disclosure. This embodiment is a variant of the embodiments illustrated by FIG. 3 and FIG. 5. Steps S1101, S1103, S1105, S1107 in the embodiment illustrated by FIG. 7 correspond to steps S101, S103, S105, S107 in the embodiment illustrated by FIG. 3, respectively. Steps S1201, S1203, S1205, S1207, S1209 in the embodiment illustrated by FIG. 7 correspond to steps S201, S203, S205, S207, S209 in the embodiment illustrated by FIG. 5, respectively. Unlike the protection method in the embodiments illustrated by FIG. 3 and FIG. 5, the protection method in the embodiment illustrated by FIG. 7 comprises the step of: performing step S1201 when step S1107 yields an affirmative determination, that is, determining whether the fan's rotation speed is less than or equal to the predetermined lower rotation speed limit, upon determination that the fan's rotation speed is less than or equal to the first restored rotation speed. Therefore, the present disclosure is effective in simultaneously implementing the embodiments illustrated by FIG. 3 and FIG. 5 by one processing process. The steps in the embodiment illustrated by FIG. 7 correspond to and are similar to the steps in the embodiments illustrated by FIG. 3 and FIG. 5 and thus are, for the sake of brevity, not described herein.

Figure 8:
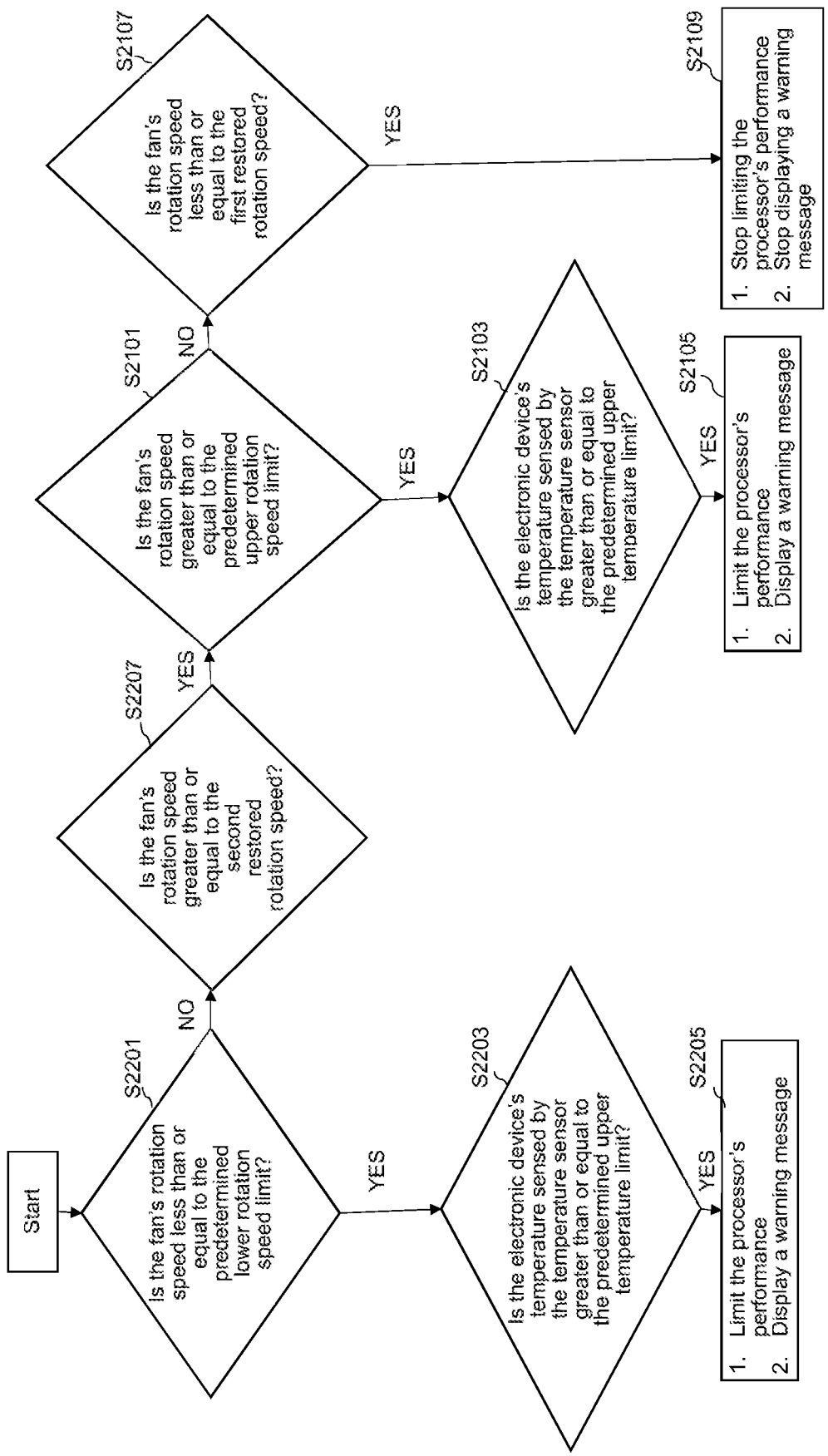
FIG. 8 is a flowchart of the protection method for use in fan malfunctions according to an embodiment of the present disclosure.

FIG. 8 is a flowchart of the protection method for use in fan malfunctions according to an embodiment of the present disclosure. This embodiment is a variant of the embodiments illustrated by FIG. 3 and FIG. 5. Steps S2201, S2203, S2205, S2207 in the embodiment illustrated by FIG. 8 correspond to steps S201, S203, S205, S207 in the embodiment illustrated by FIG. 5, respectively. Steps S2101, S2103, S2105, S2107, S2109 in the embodiment illustrated by FIG. 8 correspond to steps S101, S103, S105, S107, S109 in the embodiment illustrated by FIG. 3, respectively. Unlike the protection method in the embodiments illustrated by FIG. 3 and FIG. 5, the protection method in the embodiment illustrated by FIG. 8 comprises the step of: performing step S2101 when step S2207 yields an affirmative determination, that is, determining whether the fan's rotation speed is greater than or equal to the predetermined upper rotation speed limit, upon determination that the fan's rotation speed is greater than or equal to the second restored rotation speed. Therefore, the present disclosure is effective in simultaneously implementing the embodiments illustrated by FIG. 3 and FIG. 5 by one processing process. The steps in the embodiment illustrated by FIG. 8 correspond to and are similar to the steps in the embodiments illustrated by FIG. 3 and FIG. 5 and thus are, for the sake of brevity, not described herein.

In an embodiment, the predetermined upper temperature limit, restored temperature, predetermined upper rotation speed limit, first restored rotation speed, predetermined lower rotation speed limit, and second restored rotation speed are set by applying the product specifications of the system provided by the present disclosure and in accordance with the IEC 62368 safety standard, but the present disclosure is not limited thereto.

In conclusion, the protection method and system for use in fan malfunctions according to the above embodiments of the present disclosure protect an electronic device in fan malfunctions and thus effectively prevent the electronic device's temperature from continuously increasing.

Although the present disclosure is disclosed above by embodiments, the embodiments are not restrictive of the present disclosure. Changes and modifications may be made by persons skilled in the art to the embodiments without departing from the spirit and scope of the present disclosure. Accordingly, the legal protection for the present disclosure should be defined by the appended claims.

What is claimed is:

1. A protection method for use in fan malfunctions, applicable to an electronic device, the electronic device comprising a fan, a temperature sensor, and a processor, the protection method comprising the steps of:
    determining whether the fan's rotation speed is greater than or equal to a redetermined upper rotation speed limit;
    in response to determining the fan's rotation speed to be greater than or equal to the predetermined upper rotation speed limit, determining whether the electronic device's temperature sensed by the temperature sensor is greater than or equal to a predetermined upper temperature limit;
    in response to determining the fan's rotation speed to be greater than or equal to the predetermined upper rotation speed limit and determining the electronic device's temperature sensed by the temperature sensor to be greater than or equal to the predetermined upper temperature limit, limiting the processor's performance;
    in response to determining the fan's rotation speed to be less than the redetermined upper rotation speed limit, determining whether the fan's rotation speed is less than or equal to a first restored rotation speed; and
    in response to determining the fan's rotation speed to be less than or equal to the first restored rotation speed, stopping the limiting of the processor's performance.

2. The protection method of claim 1, further comprising the step of:
    in response to determining the fan's rotation speed to be greater than or equal to the predetermined upper rotation speed limit and determining the electronic device's temperature sensed by the temperature sensor to be also greater than or equal to the predetermined upper temperature limit, the electronic device's entering a hibernate mode.

3. The protection method of claim 1, further comprising the steps of:
    in response to determining the fan's rotation speed to be greater than or equal to the predetermined upper rotation speed limit and determining the electronic device's temperature sensed by the temperature sensor to be greater than or equal to the predetermined upper temperature limit, displaying a warning message on a display unit; and in response to determining the fan's rotation speed to be less than or equal to the first restored rotation speed, stopping the displaying of the warning message.

4. The protection method of claim 1, further comprising the step of:
in response to determining the fan's rotation speed to be greater than the first restored rotation speed, determining whether the electronic device's temperature is less than or equal to a restored temperature; and
in response to determining the electronic device's temperature to be less than or equal to the restored temperature, stopping the limiting of the processor's performance, wherein the restored temperature is less than or equal to the predetermined upper temperature limit.

5. The protection method of claim 1, wherein the first restored rotation speed is less than or equal to the predetermined upper rotation speed limit.

6. The protection method of claim 1, further comprising the steps of:
determining whether the fan's rotation speed less than or equal to a predetermined lower rotation speed limit;
in response to determining the fan's rotation speed to be less than or equal to the predetermined lower rotation speed limit, determining whether the electronic device's temperature sensed by the temperature sensor is greater than or equal to the redetermined upper temperature limit;
in response to determining the fan's rotation speed to be less than or equal to the predetermined lower rotation speed limit and determining the electronic device's temperature sensed by the temperature sensor to be greater than or equal to the predetermined upper temperature limit, limiting the processor's performance;
in response to determining the fan's rotation speed to be greater than the predetermined lower rotation speed limit, determining whether the fan's rotation speed is greater than or equal to a second restored rotation speed; and
in response to determining the fan's rotation speed to be greater than or equal to the second restored rotation speed, stopping the limiting of the processor's performance.

7. The protection method of claim 6, wherein the second restored rotation speed is greater than or equal to the predetermined lower rotation speed limit.

8. A protection method for use in fan malfunctions, applicable to an electronic device, the electronic device comprising a fan, a temperature sensor, and a processor, the protection method comprising the steps of:
determining whether the fan's rotation speed is less than or equal to a predetermined lower rotation speed limit;
in response to determining the fan's rotation speed to be less than or equal to the predetermined lower rotation speed limit, determining whether the electronic device's temperature sensed by the temperature sensor is greater than or equal to a predetermined upper temperature limit;
in response to determining the fan's rotation speed to be less than or equal to the predetermined lower rotation speed limit and determining the electronic device's temperature sensed by the temperature sensor to be greater than or equal to the predetermined upper temperature limit, limiting the processor's performance;
in response to determining the fan's rotation speed to be greater than the predetermined lower rotation speed limit, determining whether the fan's rotation speed is greater than or equal to a restored rotation speed; and
in response to determining the fan's rotation speed to be greater than or equal to the restored rotation speed, stopping the limiting of the processor's performance.

9. The protection method of claim 8, further comprising the step of:
in response to determining the fan's rotation speed to be less than or equal to the predetermined lower rotation speed limit and determining the electronic device's temperature sensed by the temperature sensor to be also greater than or equal to the predetermined upper temperature limit, the electronic device's entering a hibernate mode.

10. The protection method of claim 8, further comprising the steps of:
in response to determining the fan's rotation speed to be less than or equal to the predetermined lower rotation speed limit and determining the electronic device's temperature sensed by the temperature sensor to be greater than or equal to the predetermined upper temperature limit, displaying a warning message on a display unit; and
in response to determining the fan's rotation speed to be greater than or equal to the restored rotation speed, stopping the displaying of the warning message.

11. The protection method of claim 8, further comprising the steps of:
in response to determining the fan's rotation speed to be less than the restored rotation speed, determining whether the electronic device's temperature is less than or equal to a restored temperature; and
in response to determining the electronic device's temperature to be less than or equal to the restored temperature, stopping the limiting of the processor's performance.

12. The protection method of claim 8, wherein the restored rotation speed is greater than or equal to the predetermined lower rotation speed limit.

13. A protection system for use in fan malfunctions, comprising a fan, a temperature sensor, and a processor, wherein the protection system loads a computer program and executes the computer program to carry out a protection method, the protection method comprising the steps of:
determining whether the fan's rotation speed is greater than or equal to a redetermined upper rotation speed limit;
in response to determining the fan's rotation speed to be greater than or equal to the predetermined upper rotation speed limit, determining whether the electronic device's temperature sensed by the temperature sensor is greater than or equal to a predetermined upper temperature limit;
in response to determining the fan's rotation speed to be greater than or equal to the predetermined upper rotation speed limit and determining the electronic device's temperature sensed by the temperature sensor to be also greater than or equal to the redetermined upper temperature limit, limiting the processor's performance;
in response to determining the fan's rotation speed to be less than the redetermined upper rotation speed limit, determining whether the fan's rotation speed is less than or equal to a first restored rotation speed; and
in response to determining the fan's rotation speed to be less than or equal to the first restored rotation speed, stopping the limiting of the processor's performance.

14. The protection system of claim 13, wherein the protection method further comprises the step of:
- in response to determining the fan's rotation speed to be greater than or equal to the predetermined upper rotation speed limit and determining the electronic device's temperature sensed by the temperature sensor to be also greater than or equal to the predetermined upper temperature limit, the electronic device's entering a hibernate mode.

15. The protection system of claim 13, wherein the protection method further comprises the step of:
- in response to determining the fan's rotation speed to be greater than or equal to the predetermined upper rotation speed limit and determining the electronic device's temperature sensed by the temperature sensor to be greater than or equal to the predetermined upper temperature limit, displaying a warning message on a display unit; and
- in response to determining the fan's rotation speed to be less than or equal to the first restored rotation speed, stopping the displaying of the warning message.

16. The protection system of claim 13, wherein the protection method further comprises the step of:
- in response to determining the fan's rotation speed to be greater than the first restored rotation speed, determining whether the electronic device's temperature is less than or equal to a restored temperature; and
- in response to determining the electronic device's temperature to be less than or equal to the restored temperature, stopping the limiting of the processor's performance, wherein the restored temperature is less than or equal to the predetermined upper temperature limit.

17. The protection system of claim 13, wherein the first restored rotation speed is less than or equal to the predetermined upper rotation speed limit.

* * * * *